United States Patent
Raj et al.

(10) Patent No.: US 11,700,488 B2
(45) Date of Patent: Jul. 11, 2023

(54) PLANAR COIL LINEAR ACTUATOR AND TRANSDUCER

(71) Applicants: Anil K. Raj, Pensacola, FL (US); Timothy L. Hutchenson, Pensacola, FL (US)

(72) Inventors: Anil K. Raj, Pensacola, FL (US); Timothy L. Hutchenson, Pensacola, FL (US)

( * ) Notice: Subject to any disclaimer, the term of this patent is extended or adjusted under 35 U.S.C. 154(b) by 0 days.

(21) Appl. No.: 17/834,178

(22) Filed: Jun. 7, 2022

(65) Prior Publication Data

US 2022/0303691 A1  Sep. 22, 2022

Related U.S. Application Data

(63) Continuation of application No. 17/030,869, filed on Sep. 24, 2020, now Pat. No. 11,356,780.

(60) Provisional application No. 62/906,280, filed on Sep. 26, 2019.

(51) Int. Cl.
  *H04R 9/04* (2006.01)
  *H04R 9/06* (2006.01)
  *H04R 9/02* (2006.01)
  *H02K 3/26* (2006.01)
  *H02K 33/18* (2006.01)

(52) U.S. Cl.
  CPC ............ *H04R 9/047* (2013.01); *H02K 3/26* (2013.01); *H02K 33/18* (2013.01); *H04R 9/025* (2013.01); *H04R 9/06* (2013.01); *H02K 2203/03* (2013.01); *H04R 2400/03* (2013.01)

(58) Field of Classification Search
  CPC .......... H04R 9/047; H04R 9/025; H04R 9/06; H04R 2400/03; H02K 3/26; H02K 33/18
  See application file for complete search history.

(56) References Cited

U.S. PATENT DOCUMENTS

2013/0249323 A1* 9/2013 Backes ................. H01F 7/1646
                                                                310/12.16
2015/0076929 A1* 3/2015 Elenga ................ H02K 41/0356
                                                                310/12.22

FOREIGN PATENT DOCUMENTS

KR    20040081470 A  *  9/2004  .............. H04M 1/03

* cited by examiner

*Primary Examiner* — Sunita Joshi
(74) *Attorney, Agent, or Firm* — J. Wiley Horton (57) ABSTRACT

A planar coil linear actuator/transducer. A stack of individually driven planar coils are used. A common core passes through the center of the stack of coils. A mobile magnet resides in the core. The coils are selectively energized in order to drive the magnet as desired. It is possible to control both frequency and amplitude by controlling the motion of the magnet. In a preferred embodiment, each planar coil is created as a copper (or other conductive material) trace on a multi-layer printed circuit board.

20 Claims, 9 Drawing Sheets

FIG. 10

PLANAR COIL LINEAR ACTUATOR AND TRANSDUCER

CROSS-REFERENCES TO RELATED APPLICATIONS

This non-provisional patent application is a continuation of application Ser. No. 17/030,869. The inventors of this application are the same as those listed for the parent application.

STATEMENT REGARDING FEDERALLY SPONSORED RESEARCH OR DEVELOPMENT

Not applicable

MICROFICHE APPENDIX

Not Applicable

BACKGROUND OF THE INVENTION

1. Field of the Invention

The present invention pertains to the field of electromagnetic actuators and transducers. More specifically, the invention comprises a planar coil linear actuator utilizing a stack of independently-controlled flat coils to drive the motion of a magnet.

2. Description of the Related Art

In many endeavors it is desirable to communicate a stimulus to a human operator using the human sense of touch. In some cases, this is desirable because the visual and auditory senses are already fully engaged. In other cases it is done to communicate information that is direction-specific (such as "There is motion behind you at your five o'clock position"). This is generally called "vibro-tactile" stimulation.

Vibro-tactile actuators typically use a single coil with a mobile rare-earth magnet residing in the core. The magnet is connected to a linear spring. The driving circuitry drives the coil at the resonant frequency of the magnet/spring combination (often around 200-300 Hz). It is possible to drive such an actuator at non-resonant frequencies. However, there is a sharp amplitude roll-off on either side of the resonant frequency.

The narrow frequency response range of prior art vibro-tactile actuators is not a disadvantage in most applications. However, in some newer applications, there is a desire to transmit a much broader spectrum. As an example, there is a desire in some applications to transmit voice communication through bone conduction. This might employ a transducer placed on the skull behind the maxilla.

Telephony configured to reliably transmit human speech generally transmits frequencies between about 300 Hz and about 3000 Hz. Those skilled in the art will know that the fundamental frequencies of human speech lie below 300 Hz. However, the presence of the harmonic overtones seems to allow the listener to unconsciously infer the entire bandwidth of normal speech. Even with this narrowed band of voice telephony, however, the reader will readily perceive that a prior art vibro-tactile actuator will not be adequate. What is needed is an actuator/transducer having a much wider band. In addition, an inventive device would preferably be light (since it may be worn), thin, and inexpensive. The present invention provides just such a device.

BRIEF SUMMARY OF THE INVENTION

The present invention comprises a planar coil linear actuator/transducer. The invention is capable of a relatively broad frequency response in comparison to prior art tactors. A stack of individually driven planar coils are used. A common core passes through the center of the stack of coils. A mobile magnet resides in the core. The coils are selectively energized in order to drive the magnet as desired. It is possible to control both frequency and amplitude by controlling the motion of the magnet.

In a preferred embodiment, each planar coil is created as a copper (or other conductive material) trace on a multi-layer printed circuit board. The driver and data bus electronics may be mounted on the same circuit board in order to create a highly integrated package.

REFERENCE NUMERALS IN THE DRAWINGS 10 planar coil
12 center tap
14 edge tap
16 power/control leads
18 open core
20 linear actuator
22 magnet
24 cage
26 printed circuit board
28 via
30 lead
32 circuit trace
34 substrate
36 mask
38 connector 40 integrated circuit
42 coil area

DETAILED DESCRIPTION OF THE INVENTION

Figure 1A:
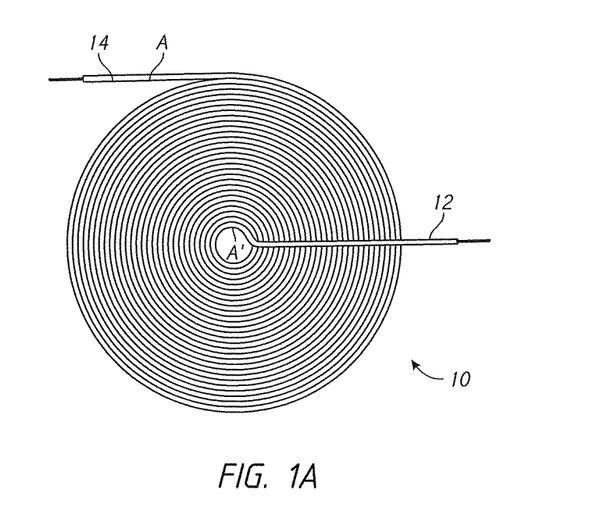
FIG. 1A is a plan view, showing a simple depiction of a planar electromagnetic coil.
Figure 1B:
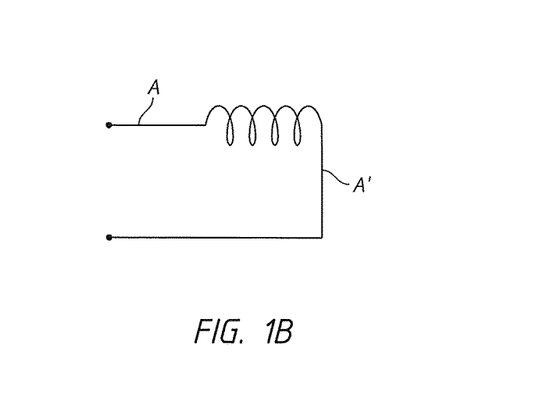
FIG. 1B is a schematic view depicting the electrical circuit of the coil of FIG. 1A.

The present invention uses planar coils to create a linear actuator. As is known to those skilled in the art, a planar coil has minimal self-inductance and may therefore react quite rapidly. FIG. 1A shows a plan view of a planar coil 10. The coil begins at A and wraps in a tight, planar spiral until it reaches the point A'. Edge tap 14 connects at A and center tap 12 connects at A.' The electrical circuit corresponding to this structure is shown at FIG. 1B.

Figure 2A:
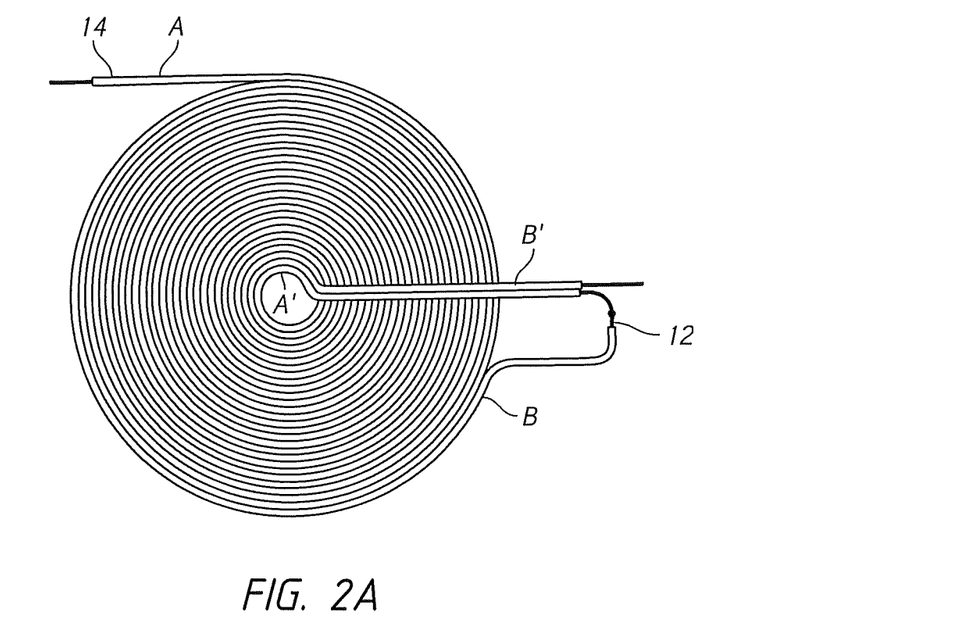
FIG. 2A is a plan view, showing a simple depiction of a parallel-wound planar coil having a center tap.
Figure 2B:
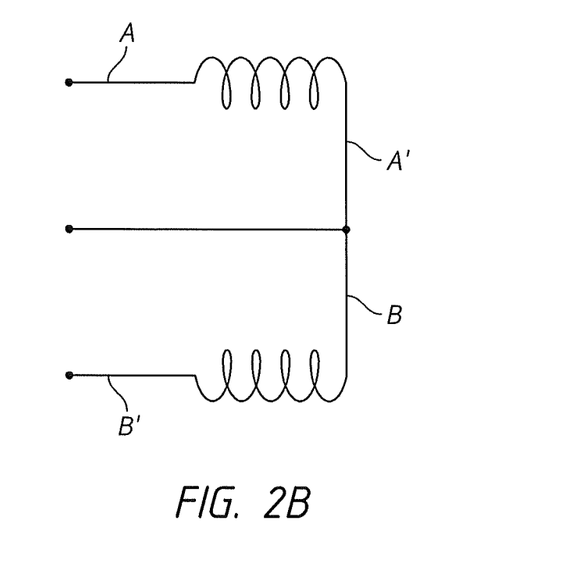
FIG. 2B is a schematic view depicting the electrical circuit of the coil of FIG. 2A.

In the present invention, it is advantageous to provide a dual winding coil with a center tap. A plan view of such a coil is shown in FIG. 2A. Two parallel coils A, B are wound in the same plane. Edge tap 14 electrically connects at point A. Center tap 12 connects at point A' as before. Center tap 12 then connects to the beginning of coil B at point B. Current then flows through coil B reaching point B.' FIG. 2B shows an electrical circuit corresponding to the structure of FIG. 2A. This structure provides a center tap 12 that may be used for sensing purposes (described in more detail later in this application).

Figure 3:
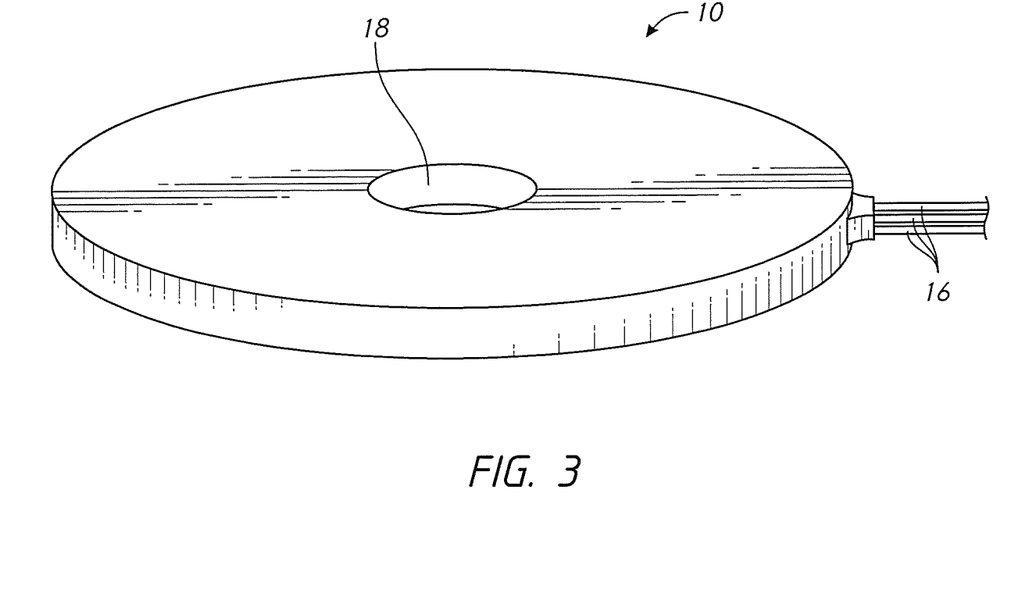
FIG. 3 is a perspective view, showing a packaged planar coil configured for use as part of the inventive linear actuator.

A planar coil can be physically realized in a wide variety of ways. A single coil can be made by creating a winding that is bonded to an insulating substrate. FIG. 3 shows this structure. Planar coil 10 includes a pair of planar windings arranged as shown in FIG. 2. A protective and insulating covering is placed over the winding and substrate. Alternatively, the winding and substrate may be potted.

Open core 18 remains in the middle of the planar coils. Power/control leads 16 extend out one side of the assembly. Two of these leads apply current to the planar coil. The third lead is the center-tap sense wire.

Figure 4:
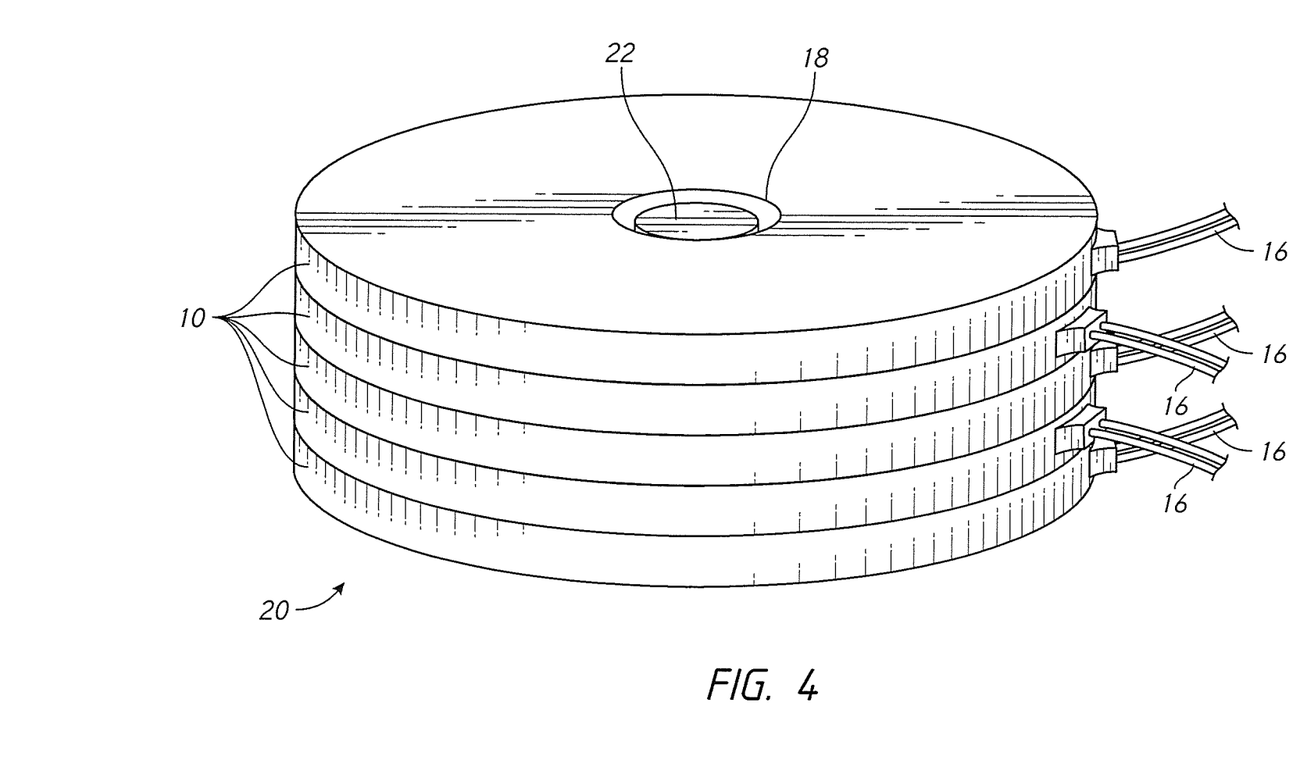
FIG. 4 is a perspective view, showing a stack of five of the planar coils shown in FIG. 3.

The present invention contemplates using a stack of planar coils. FIG. 4 shows a stack of five planar coils 10 that are used to create linear actuator 20. The central axes of all five coils are aligned so that open core 18 passes through the entire stack. Magnet 22 resides in open core 18. Individual power/control leads 16 are provided for each planar coil 10. Each individual coil in the stack can be individually energized.

Figure 5:
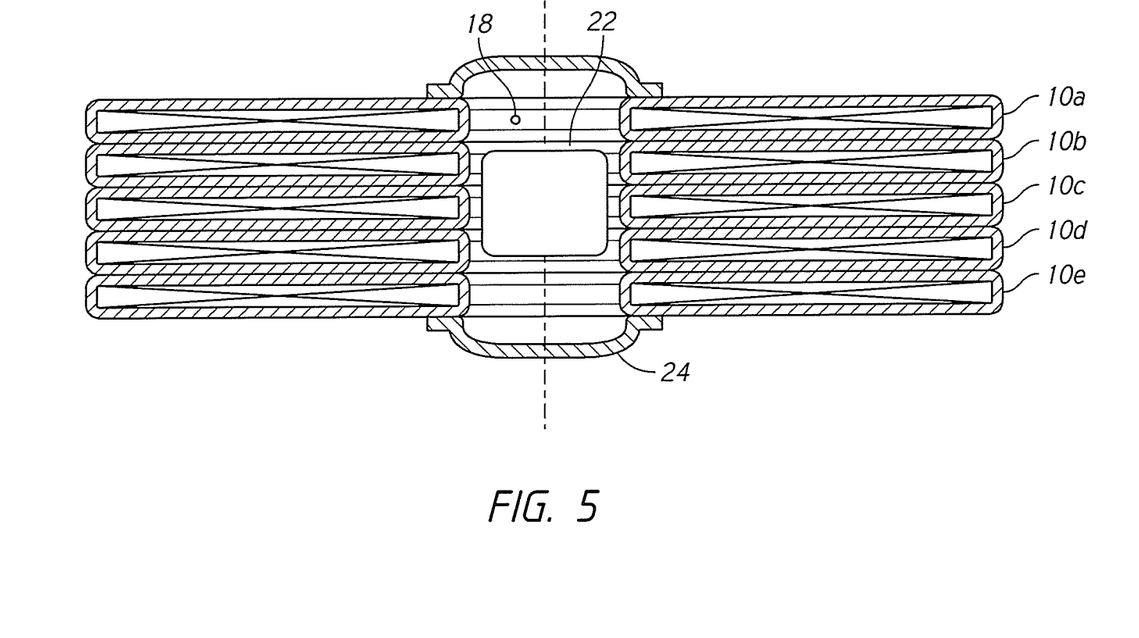
FIG. 5 is a section elevation view, showing a stack of five planar coils.

FIG. 5 shows a section elevation view through the assembly of FIG. 4. Magnet 22 is free to move along the central axis of open core 18. Its position will be driven by high-current signals applied to planar coils 10a-10e. When the actuator is in a "rest" state, it may be possible for the magnet to escape the open core. Thus, a cage device 24 may be provided over each open end of the core.

Figure 6:
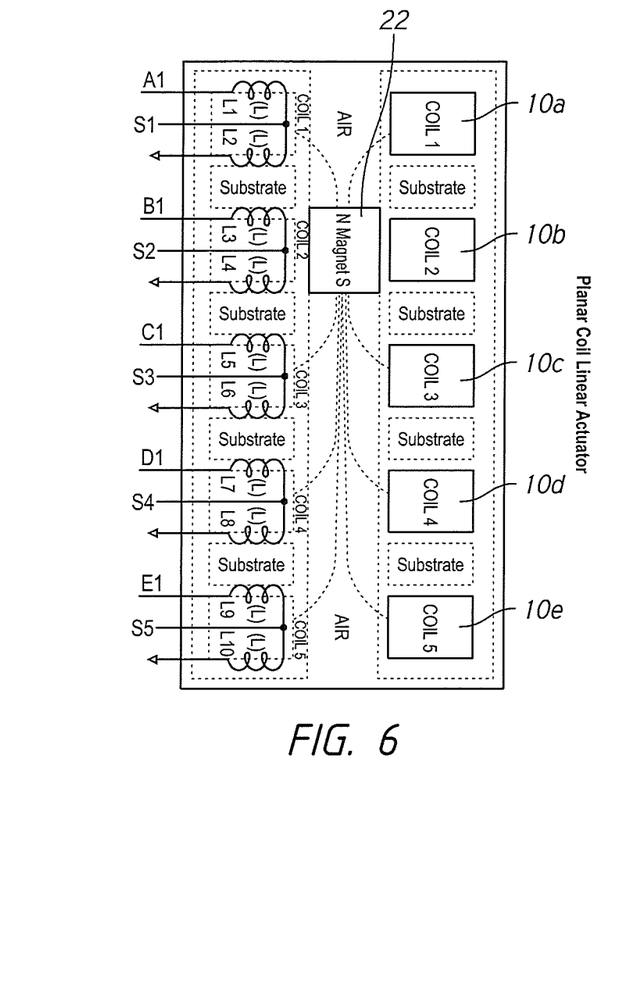
FIG. 6 is a schematic view, showing the circuit for a stack of planar coils.

FIG. 6 shows a schematic elevation view through the same coil structure as depicted in FIGS. 4 and 5. Each coil (10a-10e) can be individually driven by applying a desired voltage to its input line (A1-E1). The input current then flows through an individual coil and to ground. Each coil also features a center-tap "sense wire" (S1-S5).

Magnet 22 has two fixed poles N, S. Once the physical characteristics of the assembly are known (including the magnet mass) one can provide software that drives the voltages applied to the individual coils to produce a desired motion of the magnet. The software preferably runs on a local processor that is integral with the actuator. The software outputs the desired signal that may then be amplified as necessary to drive the coils.

Figure 7:
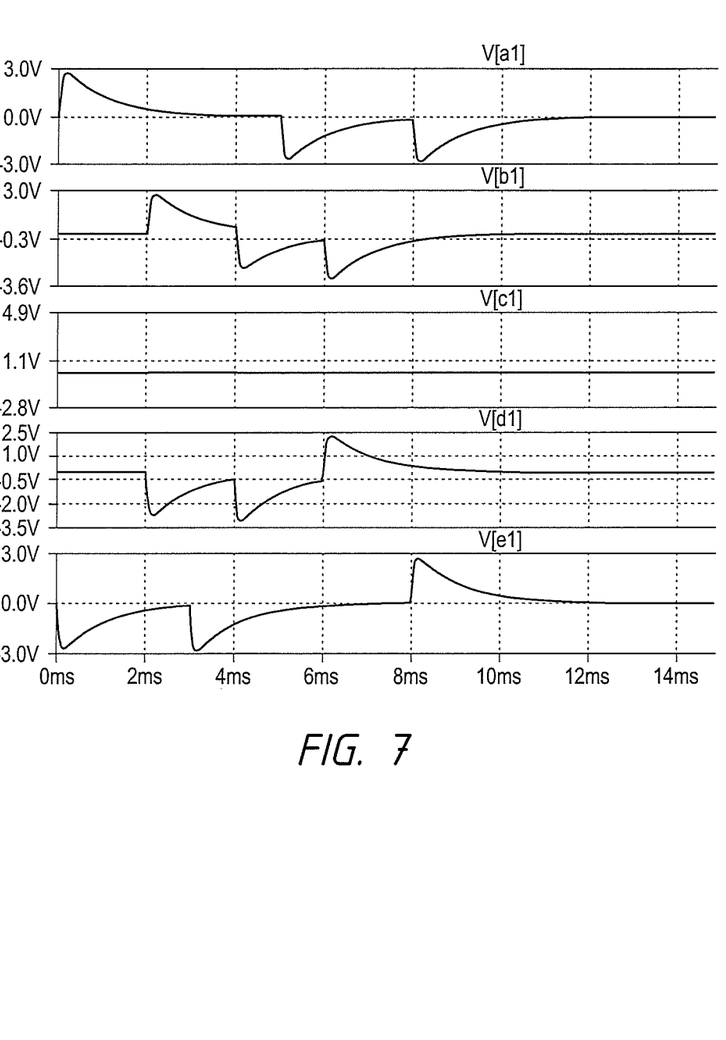
FIG. 7 is a plot showing a voltage applied to each coil in a stack in order to create a desired motion of a magnet moving in the core of the stack.

FIG. 7 shows exemplary voltages applied to the coils over time. The applied voltages create a desired motion for magnet 22. The motion is oscillatory, with the frequency being determined by the signals applied. If the actuator is attached to a device such as a tactile vest or headset, the motion of magnet 22 will be perceived as vibration at a particular frequency.

Returning to FIG. 6, the functionality of the center tap leads will be described in more detail. Each coil is a center-tapped winding. A center-tapped coil behaves as an inductor when the driving voltage is removed. If the voltage between the center tap for a coil and ground is then measured the behavior is that of a linear differential inductor. The voltage sensed can be used to infer a position of the magnet with respect to a particular coil. A bridge circuit can also be provided for the sensed line. In this configuration the voltage sensed on the tap line is linearly proportional to the displacement of the magnet with respect to the coil and a zero voltage across the bridge indicates that the magnet is centered in the coil.

The use of a center tap for the sensing of a position of a magnet with respect to a coil is understood by those skilled in the art. However, the present invention allows for the use of sensing by multiple coils—all of which are centered on the axis of motion for the magnet. This allows a control system to determine the present position of the magnet and—if needed—a present velocity.

Each time the inventive actuator is energized the magnet will be starting from a rest position (or possibly the magnet will be in a state of uncontrolled motion if inertial forces are presently causing it to move). It is important for the reader to understand that—unlike conventional actuators—the inventive actuator does not have restoring springs or comparable elements that give the magnet a fixed "rest position" when not in use. In the present invention, magnet 22 is free to move within the core when the actuator is not energized. The position of the magnet at any instant depends on the orientation of the actuator (as well as inertial effects).

The control system is preferably configured to command a "start sequence" that forces the magnet to a first position and the control system can thereafter command motion at a desired frequency. After the start sequence a series of pulses configured to drive an oscillating motion of the magnet are provided. The start sequence need not be long enough to be perceptible by the user. As an example, a 20 ms start sequence would not be perceptible apart from the oscillating sequence that follows.

It is possible to create an embodiment of the invention using existing multi-layer printed circuit board (PCB) technology. Printed circuit boards were originally created as a single layer. Here the term "single layer" means a single layer of conductive copper traces. In the original "single layer" boards, the conductive traces were bonded to an insulating substrate. Other components were attached to the board, such as by using "DIP" (dual in-line placement) technology. An insulating mask layer was then often deposited over the trace layer to prevent short circuits.

Printed circuit boards subsequently evolved to include multiple layers. Each individual substrate/trace layer is created separately. The multiple layers are then bonded together into a stack. It is often necessary to connect a trace on one layer to a trace on a separate layer. "Vias" are used for this purpose. A via is usually created by drilling a hole through a multi-layer printed circuit board in a direction that is perpendicular to the surface of the board. The perimeter of the hole is then coated with a conductive material. Wherever the hole penetrates a conductive trace on a particular layer, an electrical connection is made. In addition, PCB microelectromechanical systems (PCBMEMS) techniques can further reduce the physical size of the present invention by allowing for narrower gaps between traces while increasing the trace height to width aspect ratio to maintain current carrying capacity. PCBMEMS can further miniaturize the present invention through finer pitch integration of the device electronics.

Returning now to FIGS. 1 and 2, those skilled in the art will realize that the planar coils shown can be created as a printed trace on a printed circuit board. The center and edge taps can likewise be created as a printed trace (though some will need to lie on a different layer than the layer used for the coil—with the connection being made by a via).

Figure 8:
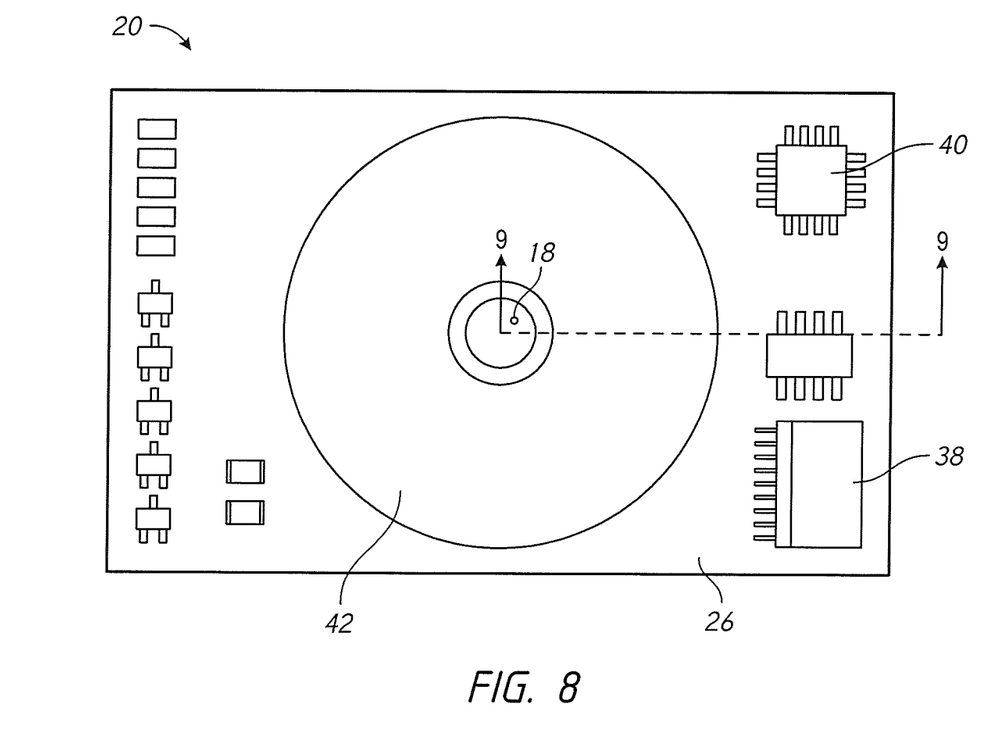
FIG. 8 is a plan view showing a multi-layer circuit board used to implement the stack of planar coils.

FIG. 8 depicts an inventive linear actuator 20 that is made using a multi-layer PC board 26. The planar coils are printed on different board layers within coil area 42. One or more integrated circuits 40 are provided to run the controlling software. Connector 38 allows external components to communicate with the linear actuator. Amplifying, regulating, and other circuitry may be included on the board as well.

Figure 9:
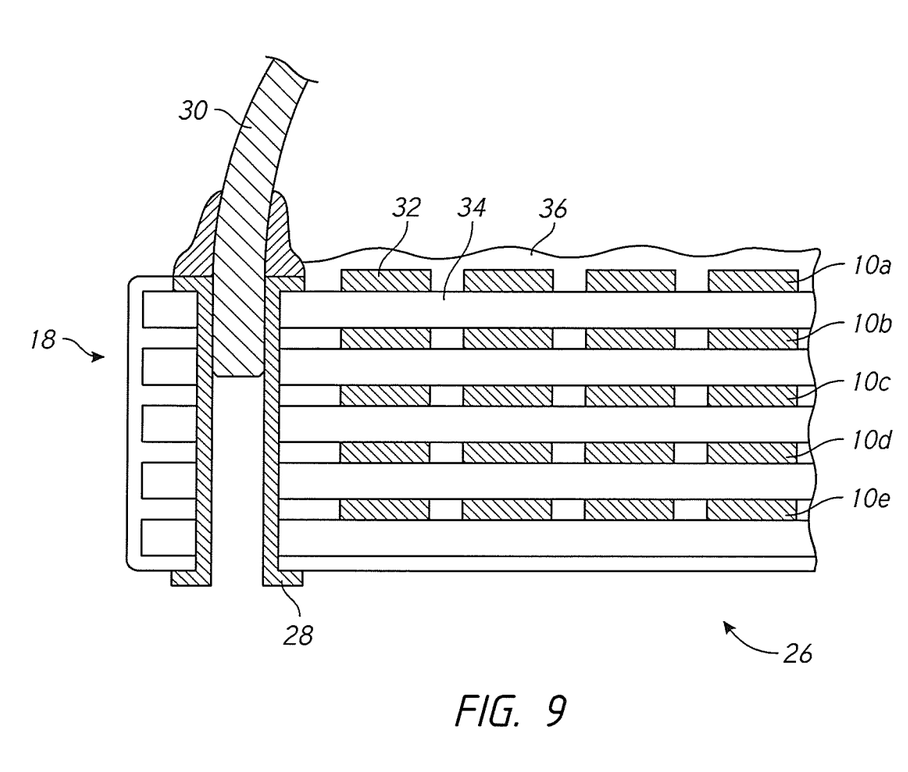
FIG. 9 is a sectional elevation view, showing a portion of the circuit board of FIG. 8.

FIG. 9 shows a sectional elevation view through the circuit board in the vicinity of open core 18. The board includes five separate substrate layers 34. Multiple circuit traces 32 are contained on each layer. The portion shown in the view shows multiple turns of each of the five planar coils 10*a*-10*e*. In addition, a single via 28 is shown. This particular via is used to connect a portion of planar coil 10*d* with lead 30 (the actual connection between the via and coil 10*d* is not shown in the section of FIG. 9). It is also possible to connect one layer to another layer using vias.

FIG. 9 shows a five-layer printed circuit board and five planar coils. However, those skilled in the art will know that current circuit board manufacturing technology allows the creation of printed circuit boards having twenty layers or more. Accordingly, the invention is by no means limited to five planar coils but might instead include twenty planar coils—or more.

Returning to FIG. 8, the operation of an exemplary linear actuator 20 will be explained in more detail. The actuator can be configured as a stand-alone device. Electrical power is brought in through connector 38 and a digital command signal is brought in. As an example, a digital audio stream might be brought in through connector 38. This audio stream would then be decoded by the electronics on board the PC board into a desired analog signal. The driving circuitry on board the PC board would then determine how to activate the planar coils so that the actuator creates the frequency response needed to create the desired analog signal.

For example, the desired signal might be a simple 500 Hz tone. On the other hand, the desired signal might be a human voice transmission. Either could be accommodated using suitable drivers.

Figure 10:
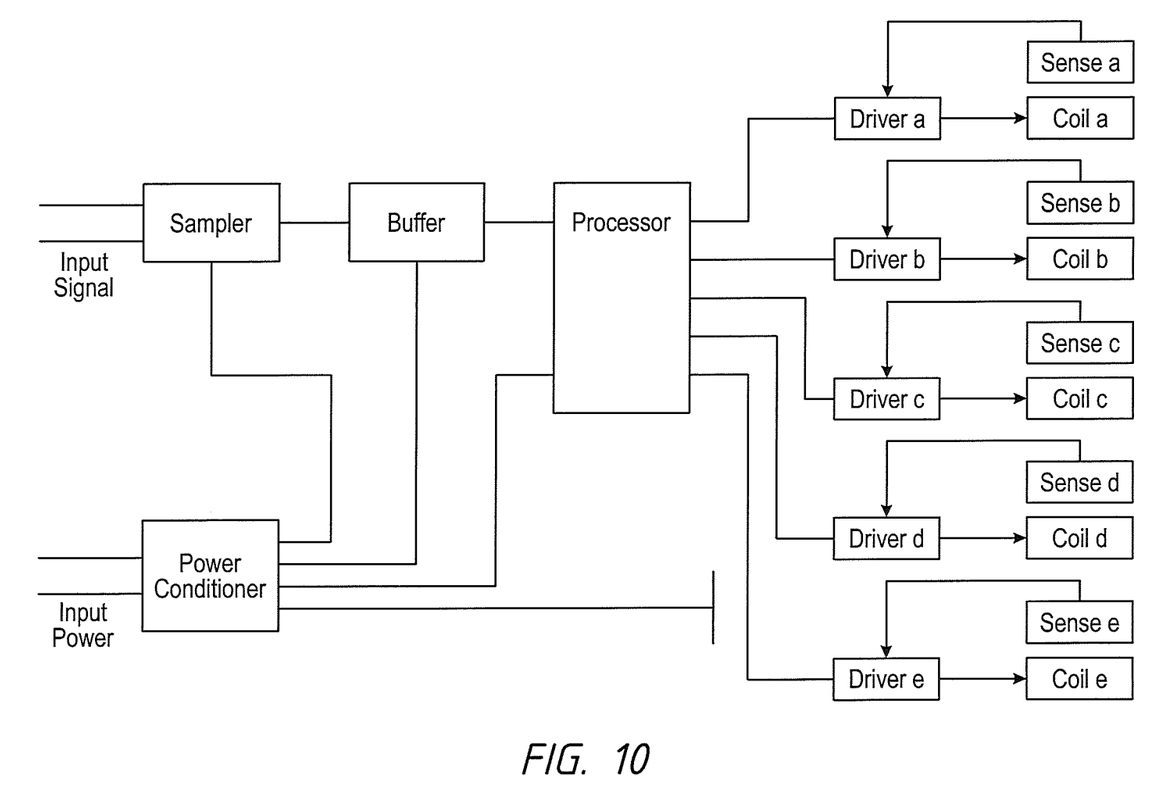
FIG. 10 is a block diagram depicting the components that might be included in an exemplary embodiment.

FIG. 10 shows a block diagram for exemplary control circuitry that could be used for the inventive actuator/transducer. External power is provided for the device as shown. This is fed into a board-level power conditioner. An input signal (in this case a digital signal) is fed into a signal sampler and then a buffer. The buffer output is fed into a processor running the software for controlling the planar coils (in this case five coils 10*a*-10*e*). The processor outputs a desired voltage pulse for each coil.

The processor output for each coil is fed to a driver dedicated to a particular coil. The driver actually applies energy to its respective coil. A sense line (center-tap) is fed from each coil back to the coil's driver. This creates a closed-loop control system that can monitor the position of the moving magnet and apply the appropriate voltage to the appropriate coil(s) to produce the desired future motion.

Many other variations are possible for the embodiments of the invention. These include:

1. An open loop control system that uses a defined start sequence followed by an open loop driving of the coils. For a fixed magnet used in an actuator in a known situation, open loop control can work;
2. A closed loop control system in which the driving current is switched off for one or more coils and the center tap for the de-energized coil is used to take a sensor reading from which a position and/or velocity of the magnet 22 can be inferred;
3. An inventive actuator with six or more coils;
4. An inventive actuator with four or fewer coils;
5. An inventive actuator wherein the coils are made as part of a PC board and the complete assembly is potted for additional toughness; and
6. An inventive actuator wherein the moving piece is a ferromagnetic material that is not a natural magnet.

Some general definitions and principles applying to the preferred embodiments can be described as follows:

1. A planar coil is a spiral winding lying in a plane around a core, where the core has a core axis that is perpendicular to the plane of the winding;
2. In a stack of planar coils, individual planar coils are stacked so that the core of each planar coil aligns with the cores of its neighbors (and all align with the core axis);
3. In order to convey voice communications using the inventive actuator, oscillating frequencies in the range of 300 Hz to 3,000 Hz are preferred. Embodiments directed to this objective can meet this requirement.

The preceding description contains significant detail regarding the novel aspects of the present invention. It should not be construed, however, as limiting the scope of the invention but rather as providing illustrations of the preferred embodiments of the invention. As an example, there is no requirement that the planar coils and the driving circuitry all be mounted on a single PC board. The planar coils might be on one PC board while the driving circuitry might be on a separate PC board. In addition, a single assembly of driving circuitry/processor(s) might be used to control multiple, independent sets of planar coil actuators. Thus, the scope of the invention should be fixed by the claims ultimately presented, rather than by the examples given.

Having described our invention, We claim:

1. An actuator for converting electrical signals into tactile signals, comprising:
    (a) a magnet movable along a core axis;
    (b) a plurality of planar coils, each of which includes a core and a spiral planar winding lying in a plane that is perpendicular to said core and wound around said core;
    (c) wherein said plurality of planar coils are stacked together with said cores of said planar coils combining to form an open core aligned with said core axis, said open core having a first end and a second end;
    (d) wherein each of said planar coils has a center tap;
    (e) said magnet being free to move within said core with no passive biasing device affecting a position of said magnet within said bore;
    (f) a control system providing a voltage for each of said planar coils, said control system being configured to switch off each of said planar coils and use said center tap for each of said planar coils to determine a current position of said magnet, thereby providing closed-loop control; and (g) said control system configured to selectively energize each of said planar coils in order to produce a desired oscillating motion of said magnet.

2. The actuator as recited in claim 1, further comprising:
(a) a first cage device closing said first end of said open core;
(b) a second cage device closing said second end of said open; and
(c) wherein said first and second cage devise trap said magnet within said open core.

3. The actuator as recited in claim 1, wherein each of said planar coils includes two separate conductors in a nested spiral, wherein said two separate conductors are joined in series.

4. The actuator as recited in claim 3, wherein said center taps are located at a point said two separate conductors are joined.

5. The actuator as recited in claim 1, wherein said actuator is configured for use in voice communication.

6. The actuator as recited in claim 1, wherein each of said planar coils is part of a printed circuit board.

7. The actuator as recited in claim 6, wherein each of said planar coils is part of a layer on a multi-layer printed circuit board.

8. The actuator as recited in claim 2, wherein each of said planar coils is part of a printed circuit board.

9. The actuator as recited in claim 8, wherein each of said planar coils is part of a layer on a multi-layer printed circuit board.

10. The actuator as recited in claim 9, wherein each of said planar coils is part of a printed circuit board.

11. An actuator for converting electrical signals into tactile signals, comprising:
(a) a magnet movable along a core axis;
(b) a plurality of planar coils, each of which includes a core and a planar winding lying in a plane that is perpendicular to said core and wound around said core;
(c) wherein said plurality of planar coils are stacked together with said cores of said planar coils combining to form an open core aligned with said core axis, said open core having a first end and a second end;
(d) wherein each of said planar coils has a center tap;
(e) said magnet being free to move within said core with no return spring affecting a position of said magnet within said bore;
(f) a control system providing a voltage for each of said planar coils, said control system being configured to switch off each of said planar coils and use said tap for each of said planar coils to determine a current position of said magnet, thereby providing closed-loop control; and
(g) said control system configured to selectively energize each of said planar coils in order to produce a desired oscillating motion of said magnet.

12. The actuator as recited in claim 11, further comprising:
(a) a first cage device closing said first end of said open core;
(b) a second cage device closing said second end of said open; and
(c) wherein said first and second cage devise trap said magnet within said open core.

13. The actuator as recited in claim 11, wherein each of said planar coils includes two separate conductors in a nested spiral, wherein said two separate conductors are joined in series.

14. The actuator as recited in claim 13, wherein said taps are located at a point said two separate conductors are joined.

15. The actuator as recited in claim 11, wherein said actuator is configured for use in voice communication.

16. The actuator as recited in claim 11, wherein each of said planar coils is part of a printed circuit board.

17. The actuator as recited in claim 16, wherein each of said planar coils is part of a layer on a multi-layer printed circuit board.

18. The actuator as recited in claim 12, wherein each of said planar coils is part of a printed circuit board.

19. The actuator as recited in claim 18, wherein each of said planar coils is part of a layer on a multi-layer printed circuit board.

20. The actuator as recited in claim 19, wherein each of said planar coils is part of a printed circuit board.

* * * * *